(12) United States Patent
Salinas et al.

(10) Patent No.: US 9,277,730 B2
(45) Date of Patent: Mar. 8, 2016

(54) PLUNGER GATE ANIMAL FEEDER ATTACHMENT

(71) Applicants: Kenneth Salinas, Laredo, TX (US); Cordelia Salinas, Laredo, TX (US)

(72) Inventors: Kenneth Salinas, Laredo, TX (US); Cordelia Salinas, Laredo, TX (US)

(*) Notice: Subject to any disclaimer, the term of this patent is extended or adjusted under 35 U.S.C. 154(b) by 290 days.

(21) Appl. No.: 14/043,555

(22) Filed: Oct. 1, 2013

(65) Prior Publication Data

US 2014/0174368 A1 Jun. 26, 2014

Related U.S. Application Data

(63) Continuation-in-part of application No. 13/796,739, filed on Mar. 12, 2013, which is a continuation-in-part of application No. 12/898,838, filed on Oct. 6, 2010, now abandoned.

(51) Int. Cl.
*A01K 5/02* (2006.01)

(52) U.S. Cl.
CPC .............. *A01K 5/0291* (2013.01); *A01K 5/0225* (2013.01)

(58) Field of Classification Search
CPC ..... A01K 5/0291; A01K 5/00; A01K 5/0114; A01K 5/02; A01K 5/0275
USPC .......... 119/51.02, 51.13, 51.12, 51.01, 51.11, 119/52.1, 54, 57.1
See application file for complete search history.

(56) References Cited

U.S. PATENT DOCUMENTS

| | | | | |
|---|---|---|---|---|
| 3,537,624 A * | 11/1970 | Hartman | ................... | A01K 5/02 119/51.11 |
| 3,599,608 A * | 8/1971 | Esquival | .............. | A01K 5/0291 119/51.12 |
| 3,900,007 A * | 8/1975 | Smith | ................... | A01K 5/0291 119/51.13 |
| 3,946,702 A * | 3/1976 | Mazzini | ............... | A01K 5/0291 119/51.13 |
| 4,069,793 A * | 1/1978 | Gower | .................. | A01K 5/0291 119/51.13 |
| 4,187,804 A * | 2/1980 | von Taschitzki | ......... | A01K 7/06 119/72.5 |
| 4,304,194 A * | 12/1981 | Boykin, II | .............. | A01K 45/00 119/51.04 |
| 4,421,059 A * | 12/1983 | Cousino | ............... | A01K 5/0291 119/51.12 |
| 4,644,903 A * | 2/1987 | Shaver | .................. | A01K 5/0291 119/51.01 |
| 5,447,120 A * | 9/1995 | Eberhardt | ................ | A01K 5/01 119/51.13 |
| 5,720,236 A * | 2/1998 | Carrano | ..................... | A01J 5/01 119/14.17 |
| 6,712,242 B2 * | 3/2004 | Friedman | ............. | B67D 1/0028 137/109 |
| 7,014,063 B2 * | 3/2006 | Shows | ................ | G06F 19/3462 221/211 |
| 7,267,078 B2 * | 9/2007 | Palett | ........................ | A01K 7/02 119/78 |
| 8,656,862 B2 * | 2/2014 | Manickchan | ........ | A01K 5/0291 119/51.01 |
| 8,776,724 B1 * | 7/2014 | Plant | ........................ | A01K 5/00 119/57.91 |
| 2009/0126640 A1 * | 5/2009 | Ulman | ................... | A01K 1/031 119/54 |

FOREIGN PATENT DOCUMENTS

GB 799562 A * 8/1958 ........... A01K 5/0291

* cited by examiner

*Primary Examiner* — Yvonne Abbott-Lewis (57) ABSTRACT

A gate valve unit that can be used with existing animal feeders that have a feed container and aperture in the feed container for allowing the feed to be dispensed. Generally, the feed is gravity fed through the aperture and contacts a spinning feed dispensing member throwing the feed about the animal feeder. The invention includes a plunger-type gate that is solenoid actuated and is closed by one or more return springs. The spinning member and the plunger gate can be actuated together by either a timer or by a wireless command from a remote location.

9 Claims, 10 Drawing Sheets

SECTION A-A
FIG. 10C

SECTION A-A

FIG. 11C

PLUNGER GATE ANIMAL FEEDER ATTACHMENT

This is a continuation-in-part of application Ser. No. 13/796,739 filed Mar. 12, 2013 which is a continuation-in-part of application Ser. No. 12/898,838 filed Oct. 6, 2010, which are hereby incorporated by reference in their entirety.

BACKGROUND

1. Field of the Invention

The present invention relates generally to animal-feeding devices used outdoors to feed livestock automatically or supplying food to game animals and more particularly to an animal feeder system with a plunger type gate for positively stopping feed from flowing out through an aperture.

2. Description of the Prior Art

U.S. Pat. No. 3,195,508 is a game and stock feeder that is automatically operable to spread a desired amount of feed at a predetermined time and for a pre-selected period. It uses a timing mechanism and does not require the presence of an operator.

U.S. Pat. No. 6,779,487 is an automated livestock feeder for storing and dispensing food such as hay or granular feed in a feed container to an animal at predetermined intervals. It utilizes a tray control flange which releases a feed tray. At a predetermined feeding time, a motor rotates the flanged latch thereby releasing the tray to rotate from a storage position to a dispense position. The activation mechanism includes an electrical power source, a timer relay/mechanical switch, and an electrical motor.

U.S. Pat. No. 4,722,300 is a programmable, automatic feeder for pets and other animals that dispenses a measured amount of food at a predetermined time. A digital clock control mechanism, including an adjustable portion control knob, controls a battery-operated motor. The motor drives an eccentric weight to vibrate a vibrating conveyor pan attached to the motor.

U.S. Pat. No. 4,491,086 is an automatic animal feeder comprising a housing defining a feeding reservoir therein. An inlet opening is provided for receiving feed in the reservoir. An outlet is associated with a motor-driven discharge device for conveying feed to a remote discharge outlet. An automatic timer controls a drive for operating the discharge device at predetermined time intervals and for predetermined time periods to thereby control the quantity of feed discharged at the remote discharge outlet during each of the time intervals.

U.S. Pat. No. 4,235,200 is an automatic animal feeder comprising a housing with a hopper for storing large amounts of dry food, and a food-delivery chamber positioned below for holding a fixed portion of dry feed received from the hopper. The food delivery chamber pivots at regular intervals from a loading position to a delivery position whereby the fixed portion of dry feed is discharged into an area accessible to an animal.

U.S. Patent Application #20080029034 is a method and apparatus for automatic feeding of animals with a food hopper connected to a feeding trough. Bulk animal food loaded into the hopper transfers into the feeding trough. A lid covers the feeding trough, preventing access to the animal food. An automated drive mechanism having a timer opens the lid, thereby allowing access to the animal food in the feeding trough, at pre-set intervals. The automatic animal feeder can be used to train wild game to feed during certain desired periods, such as daylight hours.

None of the prior art uses a plunger gate apparatus to prevent unintended dispersal of feed.

SUMMARY OF THE INVENTION

The present invention relates to a game or livestock feeding unit with remote communications. It is an object of this invention to provide a game-animal feeding unit in combination with electronic sensors that monitor the status of the feeding unit. Among its features is a volume sensor that monitors the quantity of feed in its unit and transmits that information to a distant location. Another object of this invention is to dispense feed at programmed intervals, and to communicate feeder jams and battery-life status. In addition, the unit prevents unwanted animals from accessing the feed inside the feeding unit. An optional GPS can be provided that can be interrogated or can report location.

It further relates to a game or livestock feeding unit with a plunger gate controlled by a solenoid. It is an object of this invention to provide a game-animal feeding unit that does not allow unintentional dispersal of feed. Many animals are able to learn that by spinning the spin-caster (or feed-dispersion mechanism) they can obtain feed from the feeding unit because the movement of the feed-dispersion mechanism allows feed to fall through the aperture in the bottom of the container. The present invention prevents unwanted animals from accessing the feed inside the feeding unit by closing the dispensing aperture. Thus, even if the spin-caster is turned, feed cannot exit the aperture.

Other objects of the present invention, as well as particular features, elements, and advantages thereof, will be shown in the following description and accompanying figures.

DESCRIPTION OF THE FIGURES

Attention is now directed to several illustrations to better understand features of the present invention.

Several drawings have been presented to aid in understanding the invention. The scope of the present invention is not limited to what is shown in the figures.

DESCRIPTION OF THE INVENTION

The present invention relates to an animal feeder with a feed stop in the form of a plunger gate apparatus that can prevent unintended dispersal of feed allowing the feeder to dispense feed on a predetermined schedule.

Figure 1:
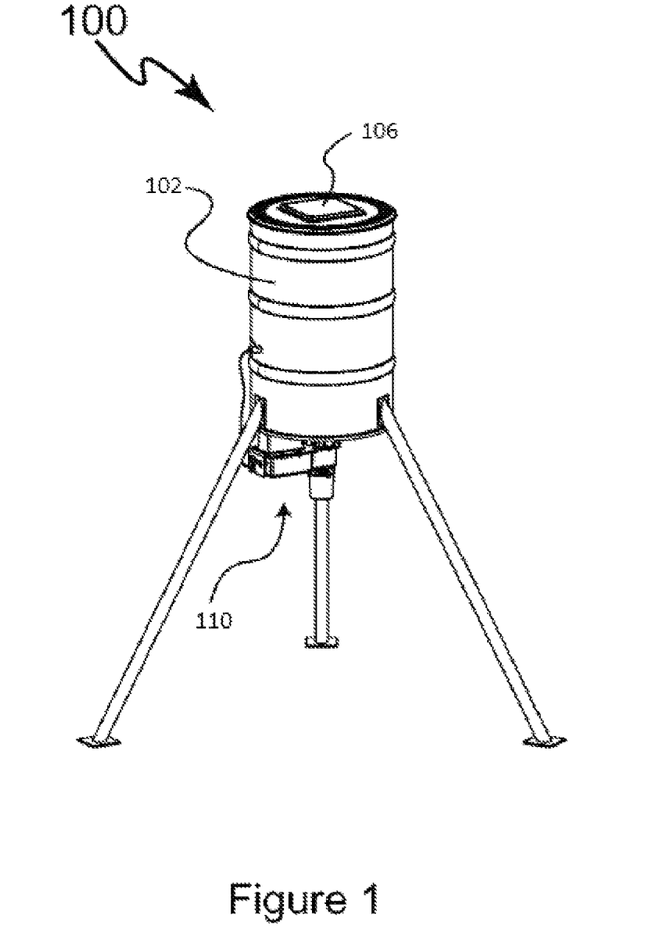
FIG. 1 a prospective view of a game feeder.

Referring to FIG. 1, the present invention is a game-animal feeder 100 that can include a feed drum or container 102, that holds animal feed and solar panel 106 on the feed drum. The feed is anticipated to be grain, such as corn, pellets, cubes, or blocks, said feed tending to pour through an aperture in the feed container 102. A feed-dispersion mechanism 110 is generally attached to the underside of the feed container 102.

The feed dispersion mechanism 110 is in electric communication with the solar panel 106 (or other power source). An aperture (not shown) in the bottom of the feed container 102 allows feed (not shown) inside of the feed container 102 to exit the feed container 102. The feed (not shown) gravity feeds through the feed drum aperture (not shown). Typically, the feed dispersion mechanism 110 (often a spin cast mechanism) is on a timer, or other activation means, that causes the feed dispersion mechanism 110 to spin. The timer is connected to said power source and when power is supplied the feed dispersion mechanism 110 spin while feed (not shown) falls through the feed drum aperture (not shown) which is dispersed by the spinning feed dispersion mechanism 110. If the feed dispersion mechanism 110 is spun at a time other than intended, the game animal feeder 100 will disperse feed (not shown) at an unintended time. Thus, some non-game animals, such as raccoons, can learn to actively spin the feed dispersion mechanism 110 so that feed (not shown) is dispersed at an unintended time and the varmint can eat the feed (not shown).

The game-animal feeder 100 can include a volume sensor 104 on or in the feed drum 102. A feed-dispersion mechanism 110 in combination with a data acquisition unit and remote communication module are generally attached to the underside of the feed drum 102.

Figure 2:
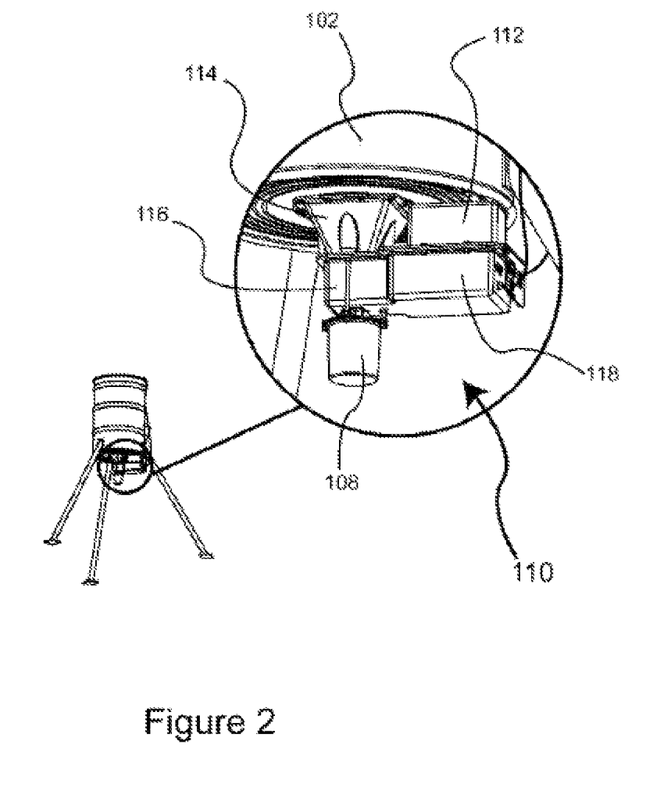
FIG. 2 is a detailed view showing the embodiment engaged with a feed container.
Figure 3:
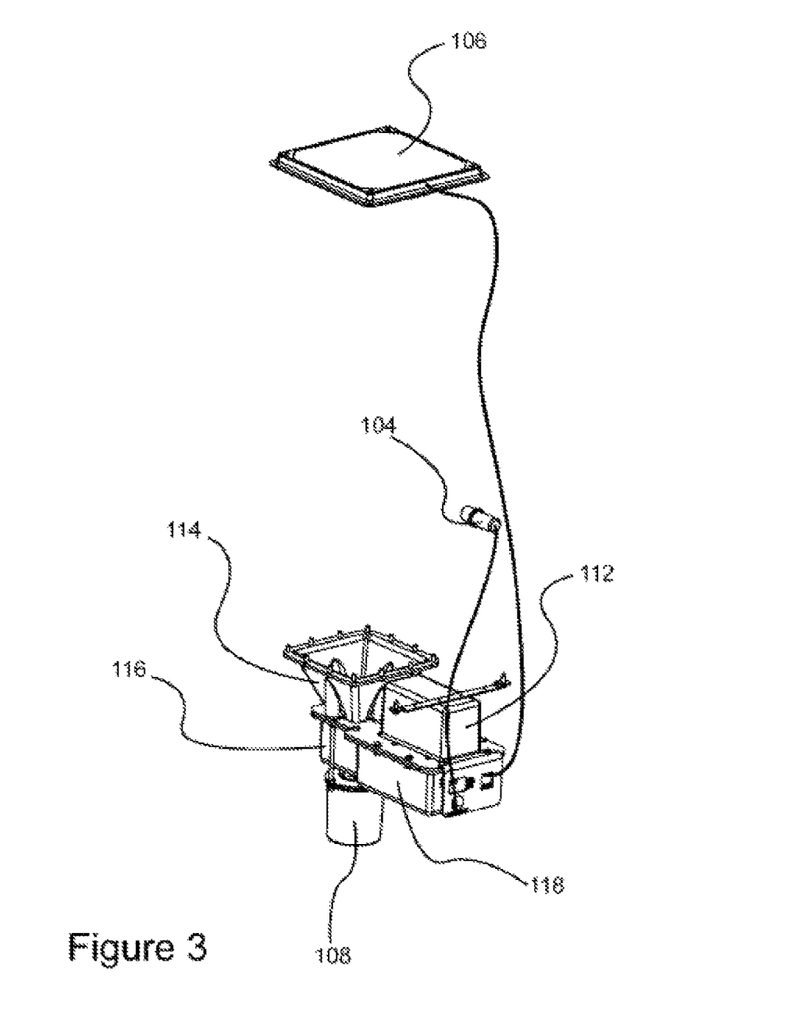
FIG. 3 is a perspective view of the primary components of the embodiment.

Referring to FIGS. 2 and 3, an embodiment of the system is shown without the feed drum. The feed-dispersion mechanism 110 with a data acquisition unit and remote communication module includes a battery 112 and communication housing attached to a drive-unit housing 118 that is connected to a feed spreader 116. The feed spreader 116 couples to a motor 108 and a funnel 114. The feed-funnel 114 is shown connected to the underside of the feed drum. The feed-dispersion mechanism 110 is generally attached to the bottom portion of a feed drum 102 (FIG. 2); however, any other location is within the scope of the present invention. A solar panel 106 (FIG. 3) provides power to the unit and is connected with the unit via a power transmission line. A volume sensor 104 is normally attached to the unit.

Figure 4:
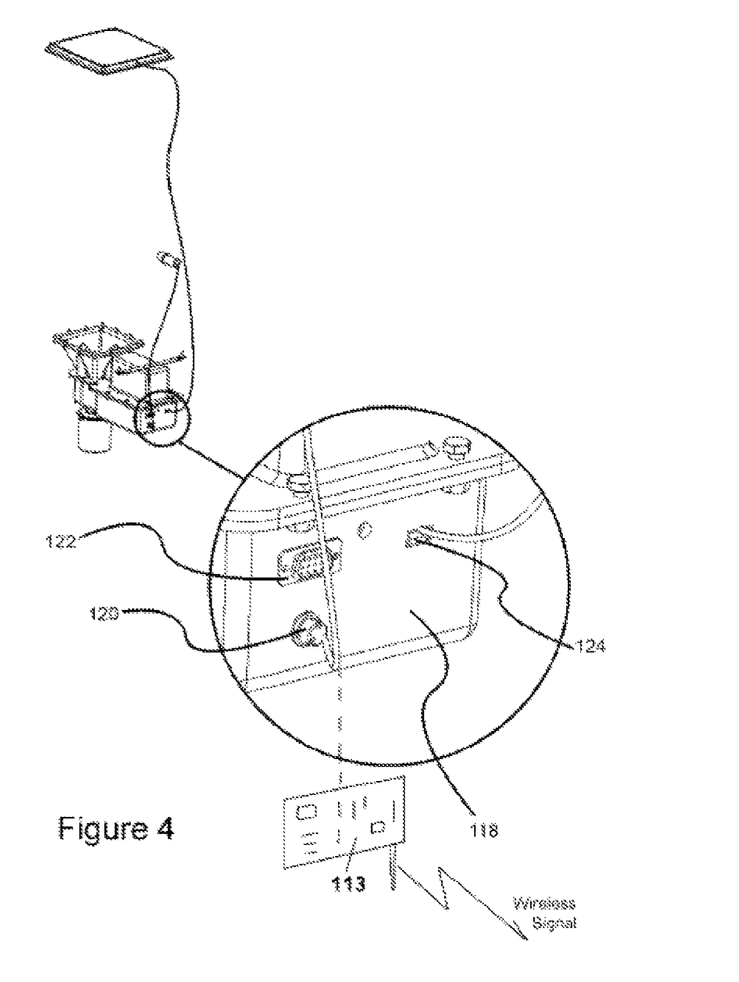
FIG. 4 is a detailed view of the communication ports.

Referring to FIG. 4, a detailed view of the embodiment illustrates various electronic and communication ports engaged with the housing 118 including an information port 122, a power input 124 and a feed-level-sensor input 120. A wireless interface 113 can also be seen.

Figure 5:
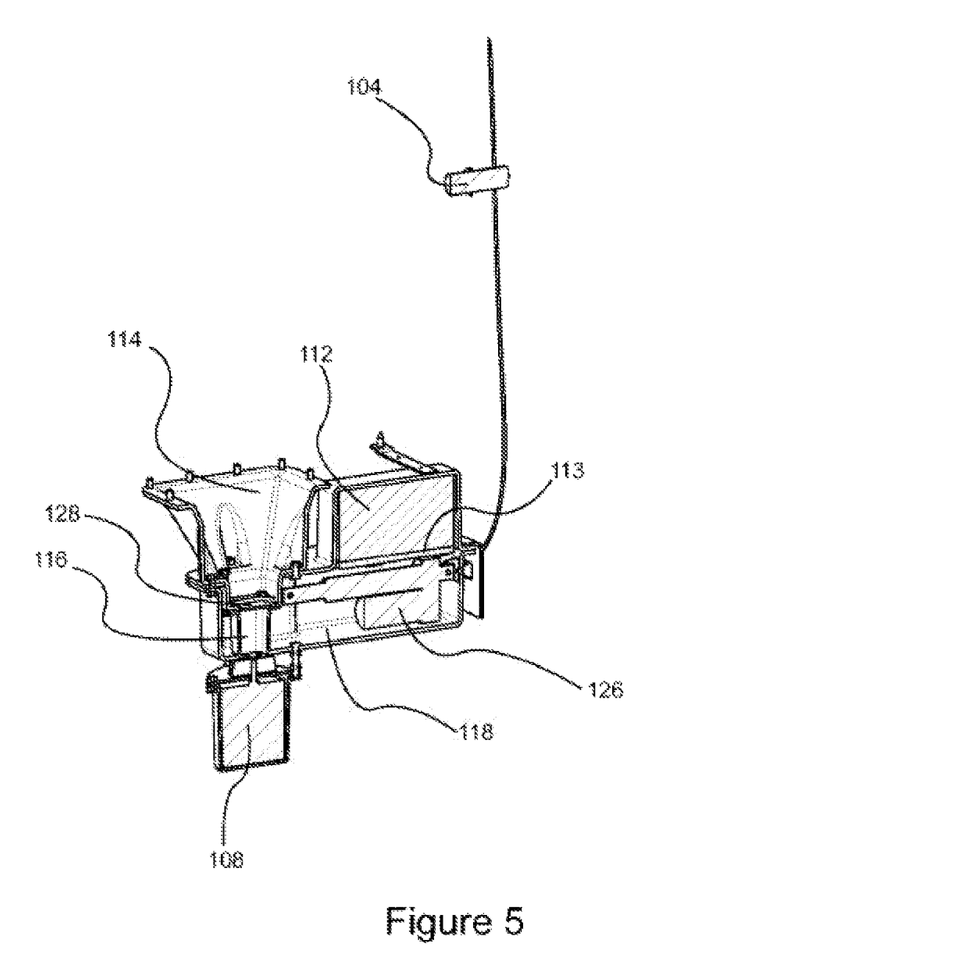
FIG. 5 is a section view of the mechanical and electrical parts of the embodiment.

FIG. 5 is a cut-away view of the feed-dispersion mechanism combination 110. The motor 108 is rotationally engaged with the feed-dispersion device 116 that is attached to the funnel 114. The path from the funnel to the feed-dispersion device 116 is opened or closed by a slide gate 128. The slide gate is controlled by a linear actuator 126 such that when power is supplied to it, the slide gate 128 can be either opened or closed. When the slide gate is in the open position, the feed dispersion device 116 can be rotated to disperse feed to the funnel. When there is no power, for whatever reason, the slide gate 128 is normally closed.

A circuit board 113 is equipped with the power and communication ports shown in FIG. 4. Communication and computing technology including a processor or central processing unit (CPU), a programmable logic controller (PLC) or the like are typically employed and not shown in detail, but are represented by circuit board 113. Any processor, microprocessor, controller, microcontroller, PLC or other computing device is within the scope of the present invention. A timer in the processor or on the circuit board 113 initiates the feed-dispersion process by sending power from the battery 112, to the linear actuator 126, thus opening the slide gate 128 and then supplying power to the motor 108 to rotate the feed dispersion device 116 that disperses feed from the funnel 114.

Feed quantity information from the volume sensor 104 is supplied to the processor as often as necessary. A low-volume signal from the volume sensor 104 can shut down the feed-dispersion process and send a signal to a remote location via wireless communication technology. Alternatively, the feed quantity, battery charge and/or other parameters can be transmitted on a schedule or can be interrogated from a remote station.

The feed-dispersion mechanism combination 110 also includes a wireless communication module on the circuit board 113 or elsewhere. The wireless communications module can communicate with a remote location via cellular telephone, WiFi, satellite telephone or other satellite communications, or by any other wireless technique. The preferred communications technique is either cellular telephone or satellite telephone. The communications can be one direction from the feeder to the remote location to report acquired data, or it can optionally be bi-directional. Data can be optionally acquired regarding feed level, battery status, feed jams or any other acquired data parameter.

The feed-dispersion mechanism combination 110 can optionally contain a GPS receiver on the circuit card 113 or elsewhere that can be aware of the feeder's location. Bi-directional wireless communication can optionally interrogate the GPS as to location. This can be useful to determine if a remote feeder has been moved, etc. The system could report location periodically or upon interrogation.

Figure 6A:
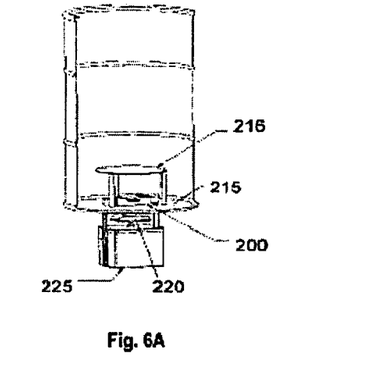
FIG. 6A shows a cut-open view of an embodiment of the present invention.
Figure 6B:
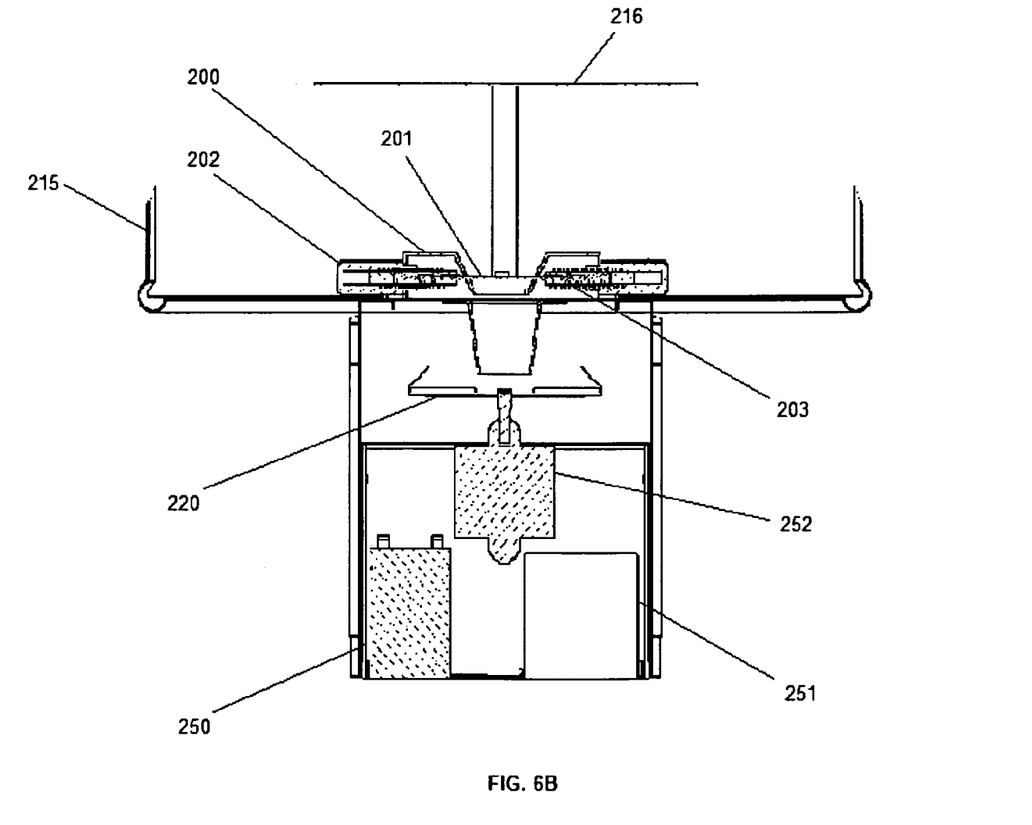
FIG. 6B shows a sectional view.

Turning to FIGS. 6A-6B, an alternative embodiment of the present invention can be seen. This embodiment is a sliding gate valve attachment that can go inside an existing feeder to control the distribution of feed (typically corn) and keep critters from getting at the feed. This embodiment can also be used with the embodiments herein described. When used with existing feeders, the gate valve of the present invention can be held in place with magnets, or can be bolted in place.

Feeders of this type typically include a feed can 215 that holds feed with a lower port that allows feed to drop onto a spin cast 220 that spins and spreads the feed in the vicinity of the feeder. This embodiment of the invention includes a gate valve 200 that can be placed or attached over the feed exit port inside the feed container 215. A battery box 225 is typically mounted below the feed container with a motor that drives the spin cast 220. A baffle plate 216 can be optionally mounted above the gate valve 200 to take some of the weight of the feed off of the gate. The gate valve 200 is equipped with solenoids 202 that open the gate 201 against return springs 203 when an electrical current is applied.

The battery or batteries located in the battery box 225 can be standard 12 volt storage batteries. While these are preferred, any other types of batteries are within the scope of the present invention. The battery box 225 typically also contains a timer 251 that times when to dispense feed and how long. This timer 251 can control the spin cast 220 and the solenoids 202. Typically, the timer 251 causes the gate 201 to open while the spin cast member 220 is rotating.

Figure 7A:
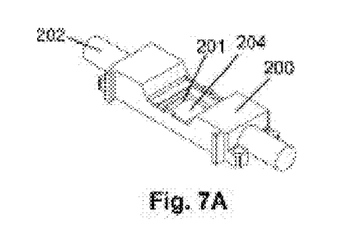
FIGS. 7A-7F show of a sliding gate embodiment.
Figure 7B:
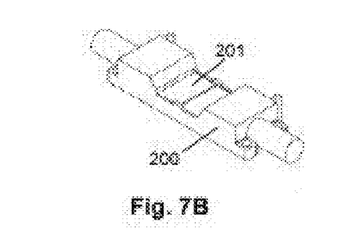

Turning to FIGS. 7A-7F, details of the sliding gate valve 200 can be seen. FIG. 7A shows an embodiment of the gate valve 200 in the open configuration where feed can be dispensed. Solenoids 202 at each end of the device can linearly pull a pair of sliding gates 201 apart to open the portal 204 such that feed can exit. FIG. 7B shows the gate valve 200 in a closed configuration. The closed gate 201 can be seen. The sliding gates and/or baffle plate are preferably made of metal; however, they can also be made of plastic or other rigid material. If made from metal, aluminum is preferred to avoid corrosion.

Figure 7C:
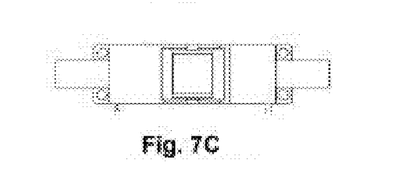
Figure 7D:
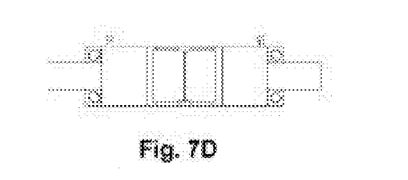
Figure 7E:
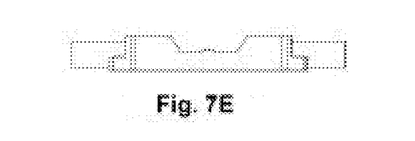
Figure 7F:
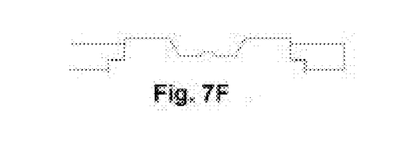

FIGS. 7C and 7D show a top view of the open and closed configurations respectively, while FIGS. 7E and 7F show side views.

Figure 8A:
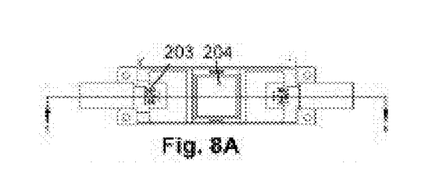
FIGS. 8A-8D show details of the embodiment of FIGS. 7A-7F.
Figure 8B:
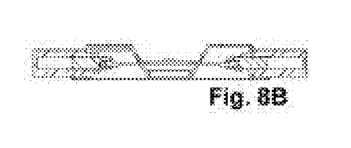

FIG. 8A shows a top-down view of the gate valve 200 in the open configuration. Covers have been removed showing the return springs 203 in a compressed state (pushing against the solenoid 202). FIG. 8B is a section of FIG. 8A along the section line shown in FIG. 8A. The relationship between the solenoids, return springs and sliding gates can be seen.

Figure 8C:
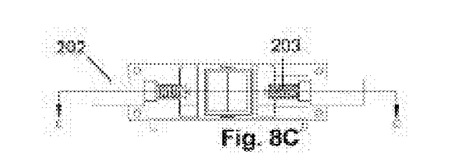
Figure 8D:
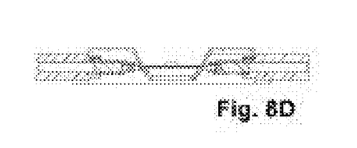

FIG. 8C shows the same gate valve 200 as FIG. 8A however, in the closed configuration. Here the return springs 203 can be seen in a relaxed state. FIG. 8D is a section of FIG. 8C taken along the section line shown in FIG. 8C. Again, the relationship between the solenoids, return springs and sliding gates can be seen.

Figure 9:
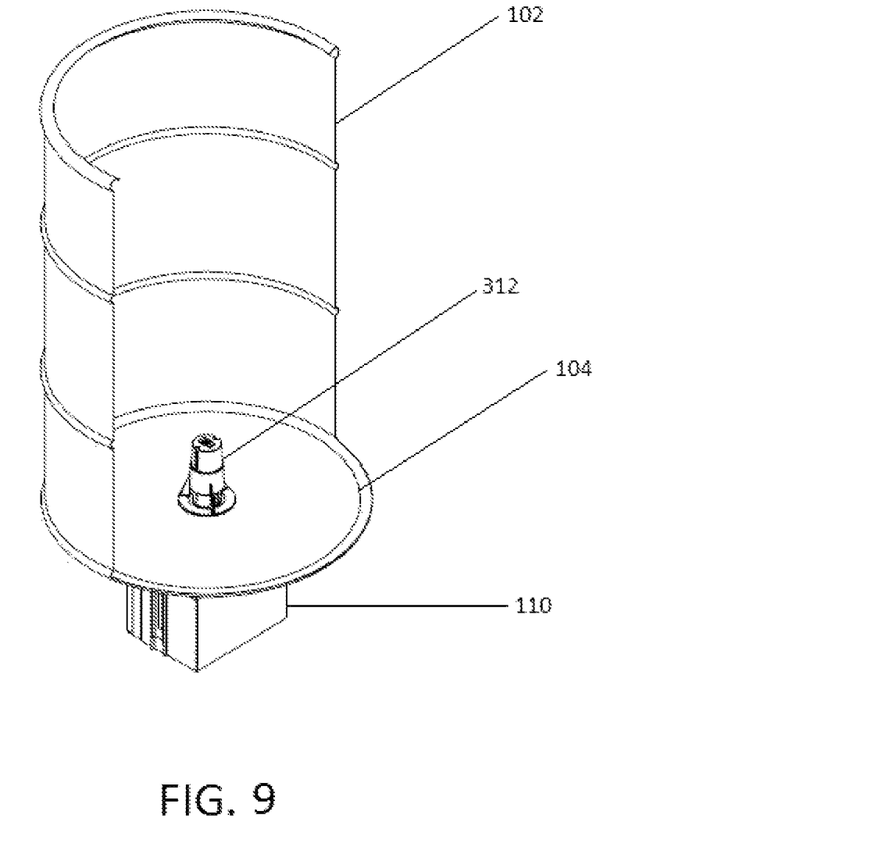
FIG. 9 is a prospective, cutaway view showing the current invention in a game feeder.

In FIG. 9, an embodiment of the plunger gate 312 is shown installed inside the feed container 102. The feed-dispersion mechanism 110 (not shown) is connected to a feed-dispersion mechanism 110. The feed-dispersion mechanism 110 couples to a motor (not shown) and a funnel (not shown). The feed-funnel (not shown) is generally connected to the underside of the feed container 102. The feed-dispersion mechanism 110 is generally attached to the bottom 104 of the feed container 102; however, any other location is within the scope of the present invention. The feed container 102 is shown cut away in order to illustrate the positioning of the plunger gate 312. The plunger gate 312 is positioned directly above the feed drum aperture (not shown), thus the housing is attachable to the feed container adjacent to the aperture. Because it is generally anticipated that feed drum aperture (not shown) will be centered in the feed drum bottom 104, it is likely generally anticipated that the plunger gate 312 will be centered on the feed drum bottom 104. The plunger gate 312 may be attached to the feed drum bottom 104 in the interior or exterior of the feed container 102. It is anticipated the plunger gate 312 is also capable and may be attached to other areas of the feed container. Feed containers are known to come in varying shapes, such as having conical bottoms in order to encourage the feed to pour out of the aperture, or separate but associated funnels may be employed. Likewise, while it is more typical for the aperture to be located in the center of the feed container bottom, the plunger gate 312 can be positioned and attached anywhere the feed aperture is, regardless of the shape of the feed container. The positioning of the plunger gate 312 allows it to block feed (not shown) in the interior of the feed container 102 from exiting through the aperture (not shown) in the feed drum bottom 104.

Figure 10A:
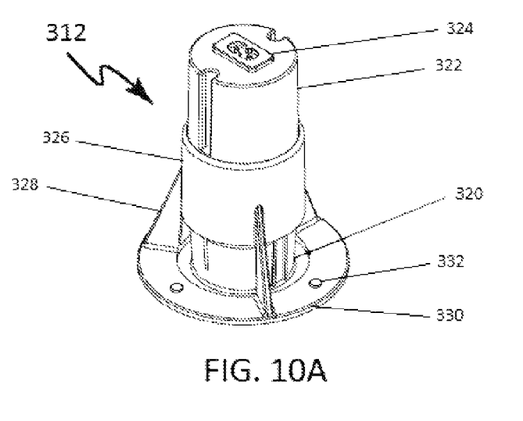
FIG. 10A is a perspective view of the plunger gate aperture in a closed position.

Referring to FIG. 10A, a detailed view of the embodiment illustrates the plunger 320 in a closed position. In one embodiment, the plunger gate 312 has a power connector 324 at the top of the top cap 322. The power connector 324 allows for electronic communications with a power source such as the solar panel 106. The top cap 322 is a generally hollow body that contains the internal components of the plunger gate 312. The top cap 322 is held in place by the main housing 326. Both the top cap 322 and the main housing 326 are elevated from the feed drum bottom 104 by at least one, but potentially multiple, support members 328. The support members 328 are attached to the main housing 326 at a first end and to a base 330 at a second end. The base 330 is connected to the feed drum bottom 104. There are multiple means by which the base 330 may be attached to the feed drum bottom 104, such as by fasteners 332 (such as bolts, screws, or rivets), magnets, or adhesives. The support members 328 must allow feed to pass through them when the plunger 320 is in the open position. Extending from below the main housing 326 is the plunger 320. The plunger 320 moves vertically in relation to the feed drum bottom 104. When extended downwardly from main housing 326, the plunger 320 engages the feed drum bottom 104 and closes the feed drum aperture (not shown). The plunger gate 312 must be positioned within the feed drum such that it is attached to the feed drum bottom 104 so that the plunger 320 is directly above the feed drum aperture. When the plunger 320 is extended, feed (not shown), such as corn, cannot flow outwardly from the interior of the feed container 102 to the feed dispersion mechanism 110 to be dispensed to the exterior of the game animal feeder 100. This ends unintended feeding of non-game animals, and can reduce the speed at which feed is dispersed. Thus, feed is only dispensed at desired intervals when game animals are more likely to take advantage of it and feed is conserved. This makes the necessity of checking and refilling the game animal feeder 100 less often.

Figure 10B:
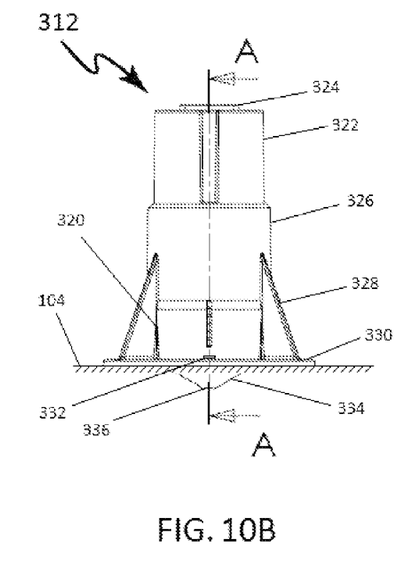
FIG. 10B is a side view of the plunger gate apparatus in a closed position.

FIG. 10B is a side view of plunger gate 312. In this embodiment, the power connector 324 can be seen at the top of the top cap 322. Holding the top cap 322 upright is the main housing 326, the support members 328 and the base 330. Base 330 is connected, in this embodiment, to the feed drum bottom 104 by fasteners 332. FIG. 3B shows the plunger 320 in the closed position. In the closed position, the plunger 320 extends downwardly from the top cap 322 and main housing 326. It is generally anticipated that the feed aperture (not shown) will be circular; it is likewise anticipated that the plunger 320 will be circular. In any case, the plunger end 334 is sized and shaped such that when it is engaged with the feed drum bottom 104 and feed aperture (not shown), the feed aperture (not shown) is blocked from allowing feed (not shown) to exit the feed container 102. In order to accomplish this, the plunger 320 may be slightly larger than the feed aperture (not shown), the same size as the feed aperture, or slightly smaller than the feed aperture, but large enough to block feed from exiting the feed aperture. While it is anticipated that the plunger 320 will be sized and shaped to match the feed aperture (not shown), this is not necessary so long as feed dispersal through the feed aperture is blocked when the plunger 320 is extended into the closed position. In order to better close the feed aperture, the first end of the plunger 320 may be shaped into a conical-like configuration in order to extend slightly through the feed aperture. This extension is the plunger end 334. Along with more tightly sealing the feed aperture, the beveled shape of the plunger end 334 and the apex, the plunger tip 336, of the plunger end 334 can help direct the plunger 320 into the feed aperture such that pressure from the feed within the feed container 102 does not dislodge or displace the plunger gate 312 and plunger 320 to the extent that when the plunger 320 is extended into the closed position the feed aperture is closed to dispersal of feed.

Figure 10C:
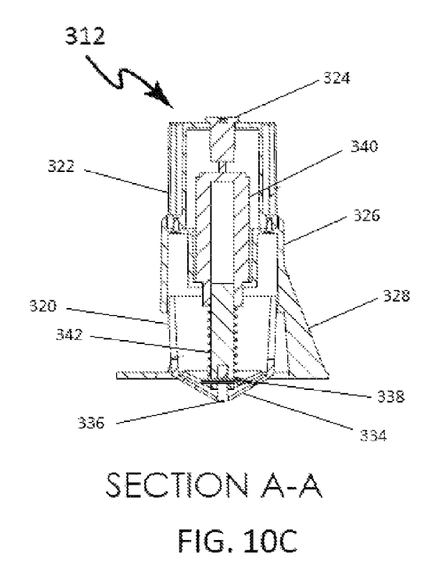
FIG. 10C is a section view of the plunger gate apparatus in a closed position along plane A-A.

FIG. 10C is a cross section of the plunger gate 312 along line A-A in FIG. 3B. In one embodiment, the plunger gate 312 receives power through the power connector 324. The power connector 324 is in electronic communication with a solenoid 340. The solenoid 340 is housed within the top cap 322. The solenoid, as used herein, refers to a variety of transducer and motor devices that convert energy into linear motion, and may include an integrated device containing an electromechanical solenoid which actuates either a pneumatic or hydraulic or electromechanical plunger, where the plunger moves to either an open (retracted) or closed (extended) position. In this embodiment, the solenoid 340, when activated, causes the plunger 320 to pull upwardly away from, and disengaging it from, the base aperture 344 and consequently from the feed aperture (not shown) in the feed drum bottom 104. When the solenoid is activated by an electrical current from a power source, it causes the plunger 320 to disengage from the aperture and move, against the opposition of the return spring, to an open position that allows feed to exit from the feed container 102. When the solenoid 340 is deactivated, the opposition of the return spring 342 against the plunger 320 acts to push the plunger 320 downwardly such that the plunger tip 336 passes through the base aperture 344, and consequently through the feed aperture (not shown) in the feed drum bottom 104, such that the plunger end 334 fills or engages the feed aperture in a closed position such that feed cannot flow through the feed aperture. The return spring 342 is attached to the plunger end 334 or plunger tip 336. This may be accomplished by pin 338.

Figure 11A:
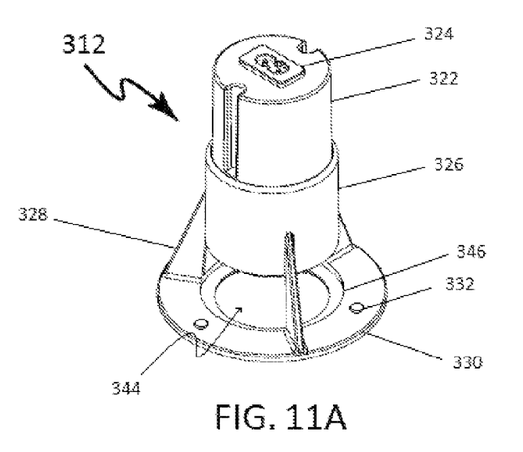
FIG. 11A is a perspective view of the plunger gate aperture in an open position.

FIG. 11A is a perspective view of the plunger gate 312 in an open position. Game feeders 100 typically include a feed container 102 that holds feed with a feed aperture that allows feed to drop onto a spin cast of a feed-dispersion mechanism 110 that spins and spreads the feed in the vicinity of the feeder 100. A power source, such as the solar panel 106, is typically mounted on the feeder 100 with a motor that drives the feed-dispersion mechanism 110. The plunger gate 312 is equipped with a solenoid 340 that opens the plunger 320 against return spring 342 when an electrical current is applied.

Power may be supplied by the shown solar panel 106, batteries, or any other power source, all being within the scope of the present invention. The feeder 100 typically also contains a timer (not shown) that times when to dispense feed and how long. This timer (not shown) can control the feed-dispersion mechanism 110 and the solenoid 340. Typically, the timer (not shown) causes the plunger 320 to open while the spin cast (not shown) is rotating. When the plunger 320 is open, corn can flow through a base aperture 344 in the base 330. When the plunger gate 312 is positioned on the feed drum bottom 104, the base aperture 344 should line up with the feed aperture (not shown) in the feed drum bottom 104 such that feed can flow through the two apertures. The base 330 may have a bevel 346 on its inner edge which can help the flow of feed. It is also advisable that the support members 328 be sized and shaped to allow for easy flow of the feed between the support members 328. The length of the support members 328 can also be increased to allow for better flow of the feed when the plunger 320 is in the open position. However, the length of the plunger 320 and the corresponding sizes of the main housing 326 and top cap 322 must be adjusted in order to accommodate the longer plunger 320.

Figure 11B:
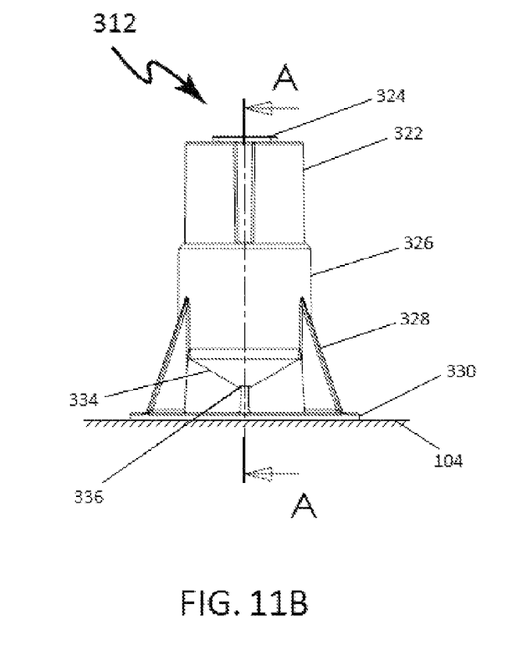
FIG. 11B side view of the plunger gate apparatus in an open position.

FIG. 11B is a side view of the plunger gate 312 in an open position. The base 330 is shown attached to the feed drum bottom 104. The plunger tip 336 and between the support members 328 allows feed to travel through the base aperture 344 and the feed aperture (not shown). It is anticipated that the feed will be gravity fed. However, other feeding mechanisms may be applied.

Figure 11C:
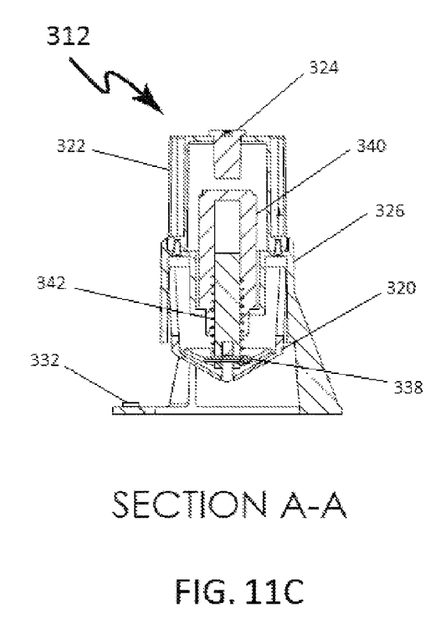
FIG. 11C is a section view of the plunger gate apparatus in an open position along plane A-A.

FIG. 11C is a side view of the plunger gate 312, cut away along line A-A from FIG. 4B. Details of the plunger gate 312 can be seen. In this embodiment, the plunger 320 is in the open position where feed can be dispensed. Solenoid 340 at the top of the plunger 320 can linearly pull the plunger 320 upwardly to open the base aperture 344 and the feed aperture (not shown) allowing the feed to exit. The top cap 322, the main housing 326, the support members 328, and the base 330 of the plunger gate 312 can be made of plastics, metals, resins, or other rigid material sufficient to withstand the pressure within the feed-filled feed container 102. It is preferable that the components of the plunger gate 312 be made from corrosion-resistant materials. For example, if made from metal, aluminum helps to avoid corrosion. In the open configuration, the return spring 342 is in a compressed state (pushing against the solenoid 340) with the plunger 320 pulled upwardly. Power received from a power source into the power connector 324 which is in electronic communication with the solenoid 340, causes the solenoid to pull the plunger 320 upwardly against the resistance of the return spring 342. When power is discontinued, and the solenoid 340 stops pulling against the return spring 342, the return spring 342 acts to move the plunger 320 back downwardly into the base aperture 344 and feed aperture (not shown). This figure shows the relationship between the solenoid 340, the plunger 320, and the return spring 342.

It is preferred to mount the plunger gate 312 internally in the feed container 102 because the plunger gate 312 is not exposed to the elements. Even though it is preferred to mount the gate valve internally, it is within the scope of the present invention to mount it anywhere, so long as the plunger 320 closes the feed aperture (not shown) in the closed position, and allows feed to pass through the feed aperture (not shown) in the open position.

Several descriptions and illustrations have been provided to aid in understanding the present invention. One with skill in the art will realize that numerous changes and variations are possible without departing from the spirit of the invention. Each of these changes and variations are within the scope of the present invention.

We claim:

1. A plunger gate attachment that can be added to an animal feeder, said animal feeder having a feed container with an aperture in the bottom of said feed container, wherein feed contained in said feed container tends to pour through said aperture and exit said feed container, said plunger gate comprising:
 a housing, wherein said housing is attachable to said feed container at a location adjacent to said aperture;
 a plunger, wherein said plunger is generally elongated and has a plunger end proximal to said housing attachment location and has a second end distal from said housing attachment location;
 wherein said plunger is operatively connected with said housing such that said plunger moves in a generally perpendicular direction from said housing attachment location;
 a top cap, said top cap having a solenoid in operative communication with said plunger and causing said plunger to move to either an open or closed position;
 wherein said solenoid is in electrical communication with a power source;
 wherein said plunger end is sized and shaped such that when said plunger is in said closed position said plunger end fills said aperture to the extent that said aperture is blocked from allowing feed to exit said feed container; and wherein when said plunger is in said open position, said aperture is open allowing feed to exit said feed container.

2. The plunger gate attachment of claim 1 further comprising:

a return spring in operative opposition to said plunger moving to said open position;

wherein when said solenoid is activated by said power source, said plunger moves against said return spring opposition to said open position; and wherein when said solenoid is deactivated, said return spring opposition causes said plunger to move into said closed position.

3. The plunger gate attachment of claim 2, wherein said housing is further comprised of:

a main housing containing said plunger;

a base, wherein said base is connectable to said feed container;

at least one support member having a first end connected to said main housing and a second end connected to said base; and wherein said base has a base aperture.

4. The plunger gate attachment of claim 3, wherein said base is attached to said feed container on the inside of said feed container.

5. The plunger gate attachment of claim 3, wherein said base is attached to said feed container on the outside of said feed container.

6. The plunger gate attachment of claim 3, wherein said housing is attached to said feed container by one of: fasteners, magnets, or adhesives.

7. The plunger gate attachment of claim 1, wherein said housing is attached to said feed container on the inside of said feed container.

8. The plunger gate attachment of claim 1, wherein said housing is attached to said feed container on the outside of said feed container.

9. The plunger gate attachment of claim 1, wherein said housing is attached to said feed container by one of: fasteners, magnets, or adhesives.

\* \* \* \* \*